H. F. SNYDER.
THRESHING MACHINE FEEDER.
APPLICATION FILED SEPT. 6, 1912.
1,200,253.
Patented Oct. 3, 1916.
6 SHEETS—SHEET 1.
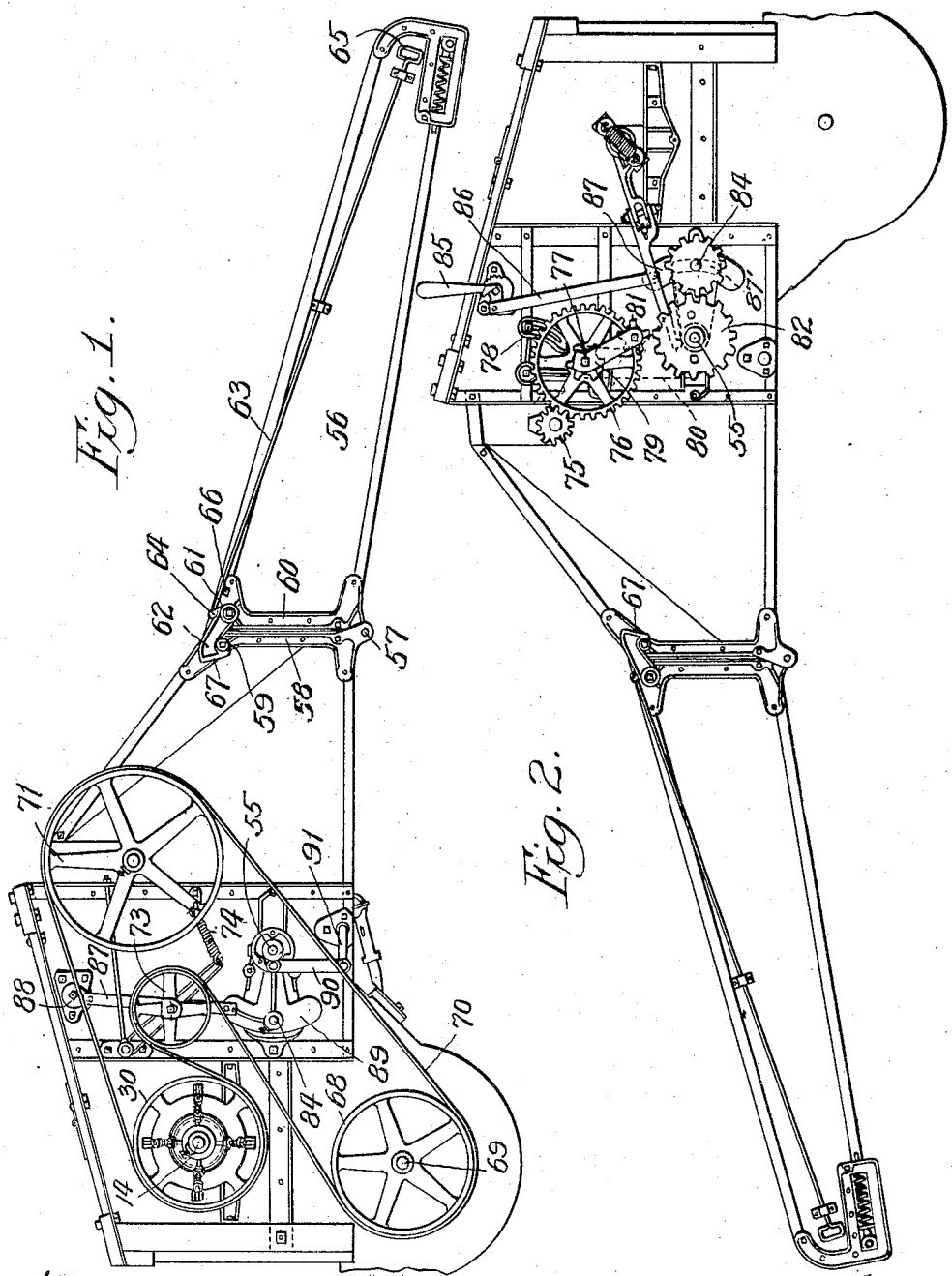
Witnesses:
John Enders
F. A. Ploell
Inventor:
Howard F. Snyder,
by Wallace R. Lane.
Attys

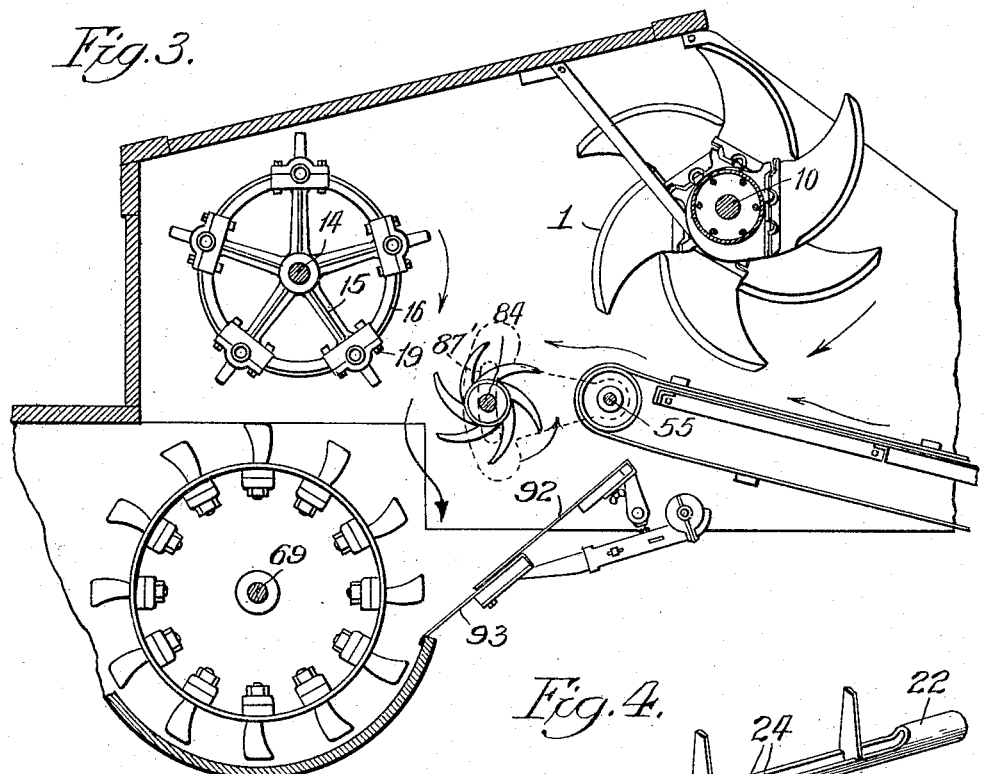
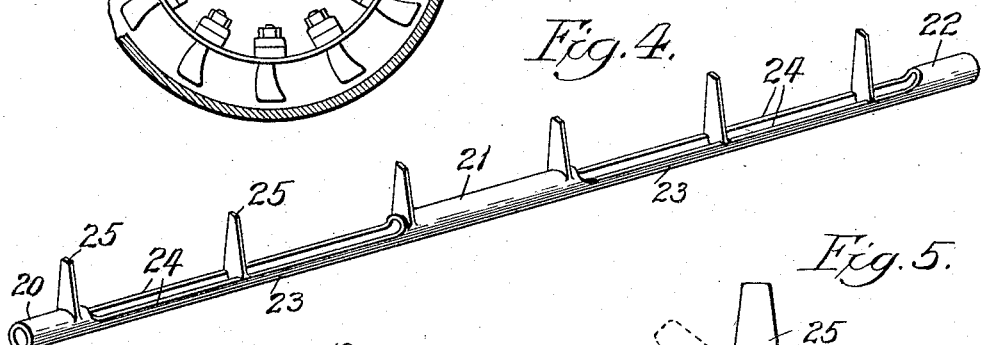
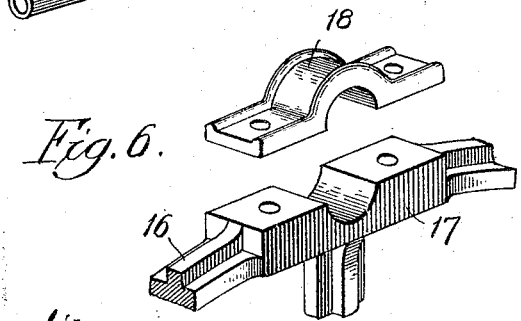
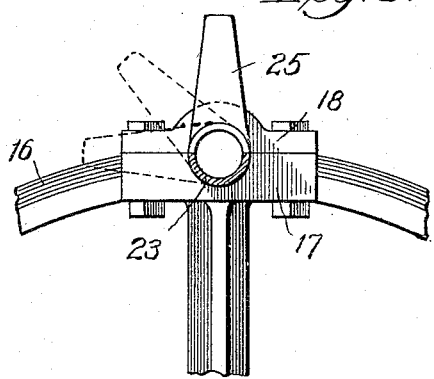

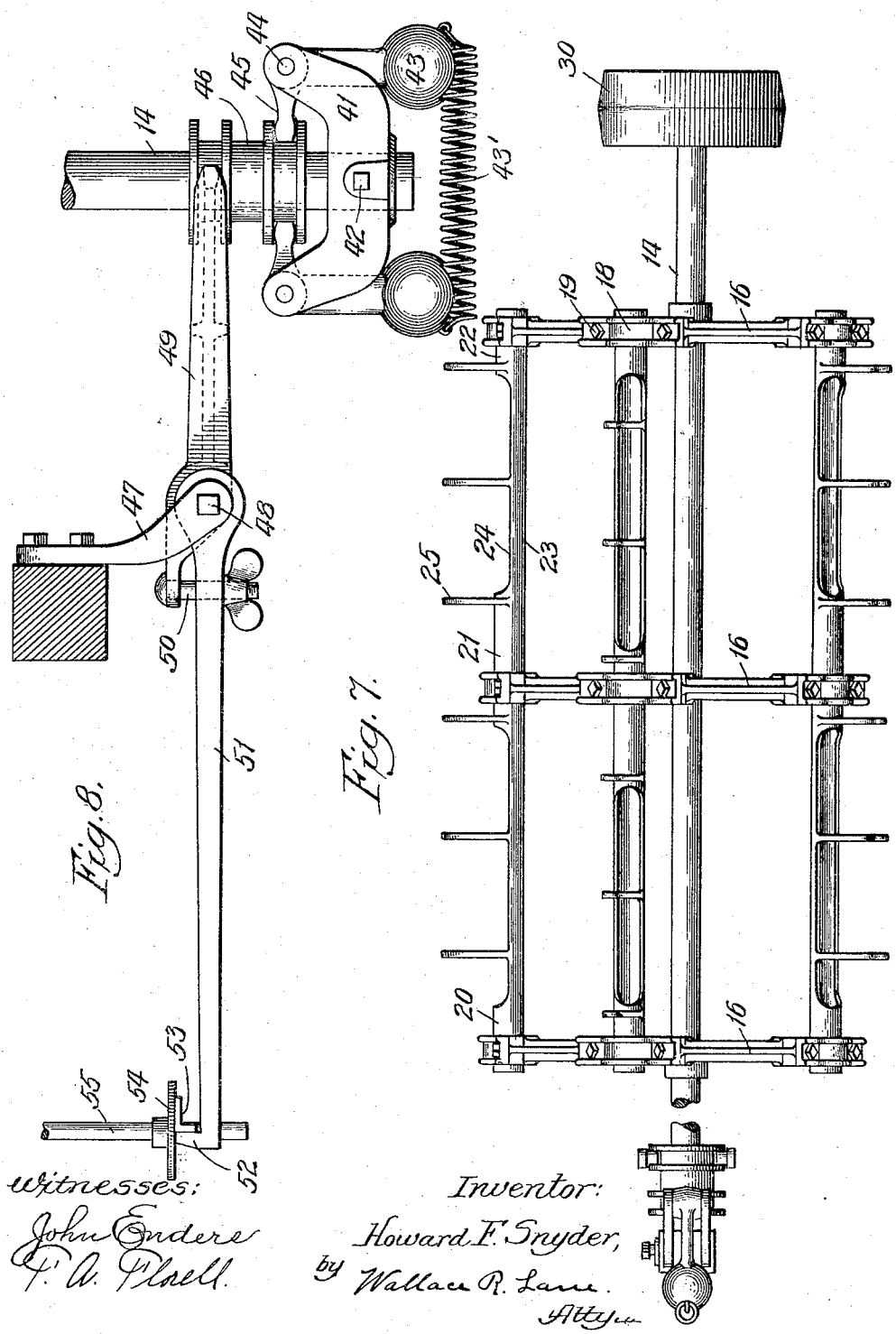

H. F. SNYDER.
THRESHING MACHINE FEEDER.
APPLICATION FILED SEPT. 6, 1912.
1,200,253.
Patented Oct. 3, 1916.
6 SHEETS—SHEET 4.
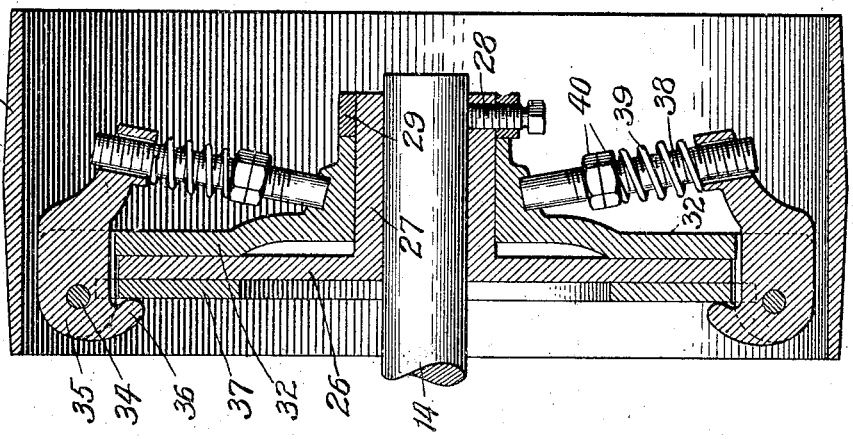
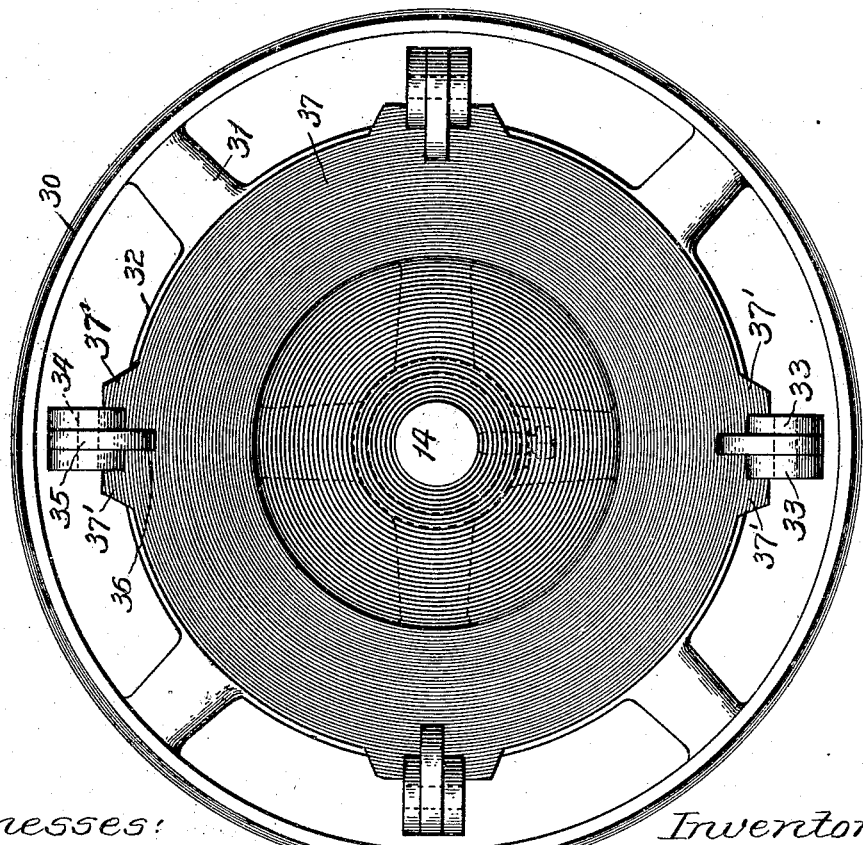

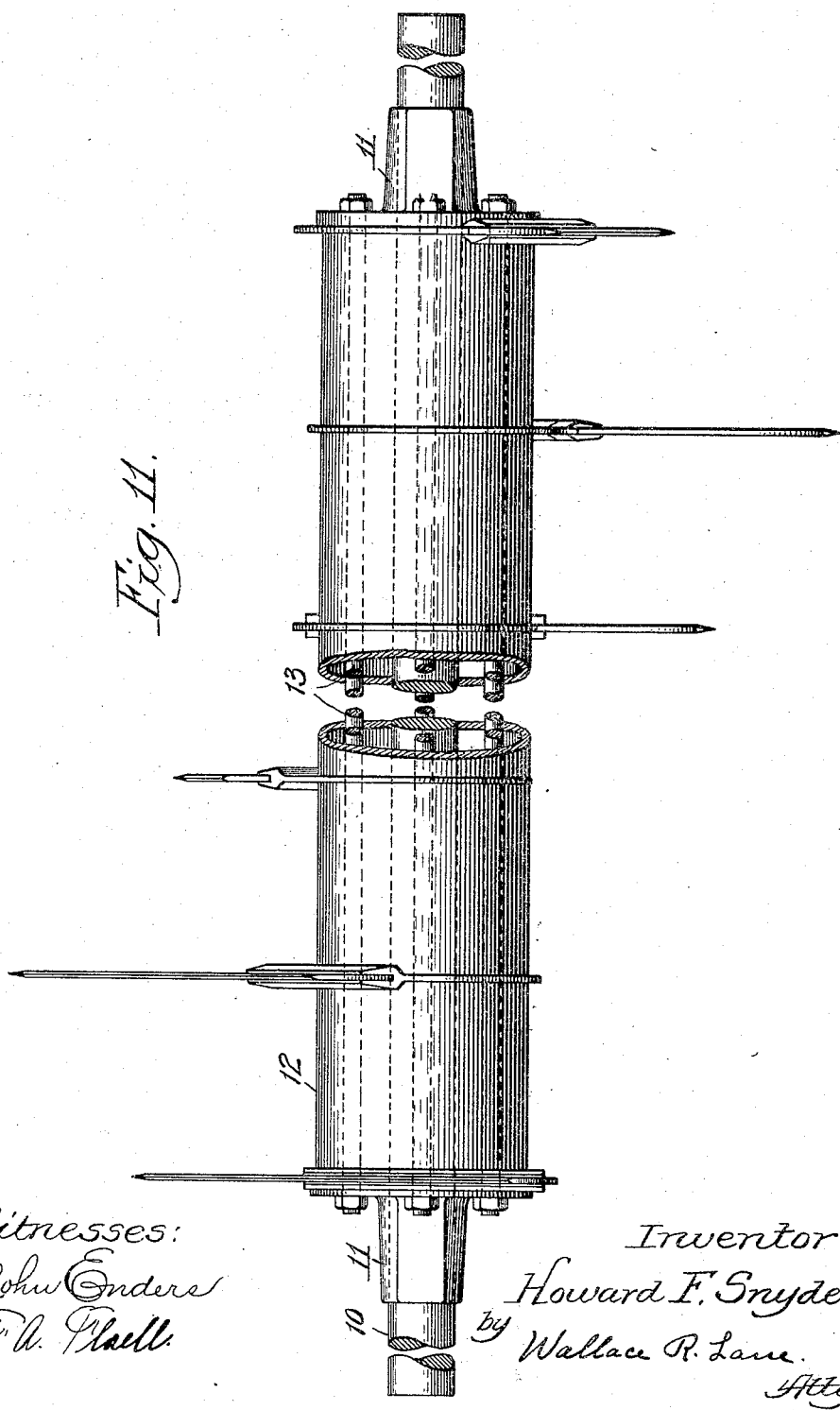

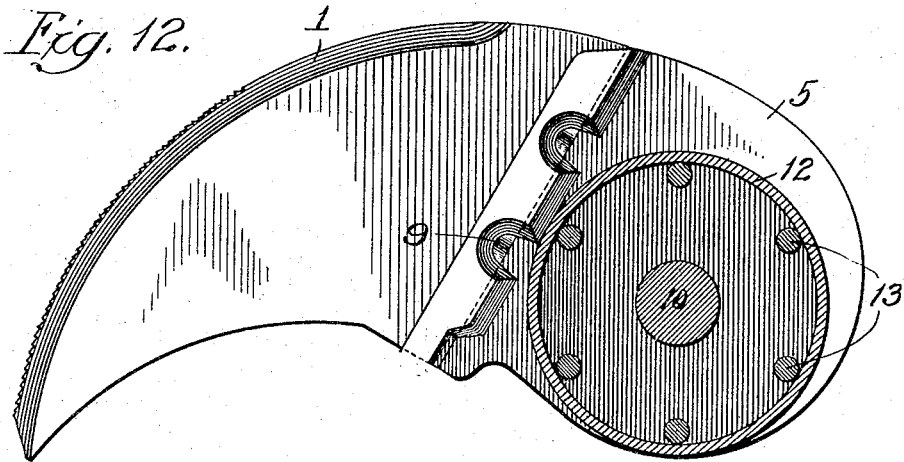
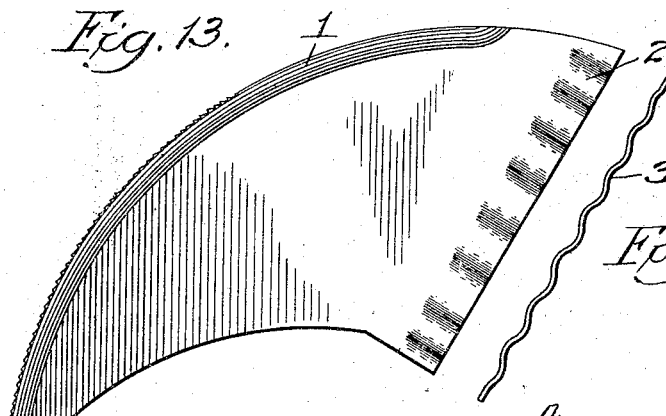
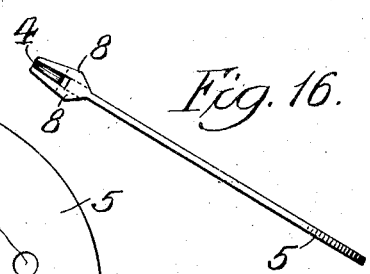
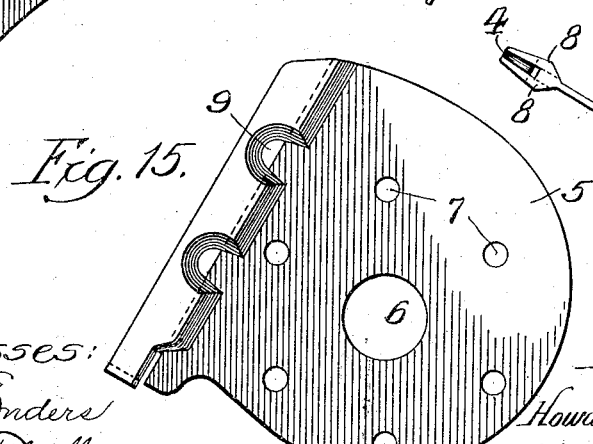

UNITED STATES PATENT OFFICE.

HOWARD F. SNYDER, OF NEWTON, IOWA, ASSIGNOR TO THE MAYTAG COMPANY, A CORPORATION OF IOWA.

THRESHING-MACHINE FEEDER.

1,200,253.       Specification of Letters Patent.    Patented Oct. 3, 1916.

Application filed September 6, 1912. Serial No. 718,865.

*To all whom it may concern:*

Be it known that I, HOWARD F. SNYDER, a citizen of the United States, residing at Newton, in the county of Jasper and State of Iowa, have invented new and useful Improvements in Threshing-Machine Feeders, of which the following is a specification.

It is the object of the present invention to provide a feeder suitable for use in conjunction with a threshing machine and having special features of construction insuring reliability in the operation of cutting the bands of the bundles and spreading and distributing the grain to the cylinder of the thresher at a uniform rate regulated at all times to prevent over-feeding and choking at the cylinder.

More particularly, the feeder of the present invention embodies improvements in the shape, position and mounting of the band cutting knives, and changes in the construction of the beater whereby the action may be regulated in accordance with the weight of the straw to be handled and the dampness of the bundles. Also, automatic regulating means is provided for retarding or stopping the feeding action when the cylinder is rotating at such low speed or is so filled with grain that there is danger of choking.

Improvements in the bundle carrier and its adjuncts, and in various other parts of the structure, have been effected for increasing the convenience and reliability of action and otherwise improving the operation of the structure as a whole.

These and other objects and advantages will be made clear by the following detailed description which is to be taken in conjunction with the accompanying drawings wherein—

Figure 1 is a side elevation of the complete feeder positioned on the end of a threshing machine and belted to a pulley on the cylinder shaft. Fig. 2 is a similar view of the opposite side of the feeder. Fig. 3 of the opposite side of the feeder. Fig. 3 is a transverse longitudinal section. Fig. 4 is a detail of one set of adjustable beater arms. Figs. 5 and 6 show the mounting of a beater arm on the periphery of its supporting cage. Fig. 7 is a detail of the beater cage with a ball governor at one end of the shaft and a friction clutch or slipping pulley at the other end. Fig. 8 shows the ball governor and its coöperating levers. Figs. 9 and 10 are details of the friction clutch mounted on the end of the beater shaft. Fig. 11 is an elevation partly broken away showing the improved knives and their novel mounting. Fig. 12 is a side elevation of a knife held in its supporting socket. Figs. 13 and 14 show the knife removed from the socket and illustrate particularly the fluted character of the inner edge of the knife. Figs. 15 and 16 are details of the knife-holding socket.

In accordance with the general operation of the machine, the bundles of grain are advanced on a moving carrier and pass under rapidly revolving band cutters which sever the binding twine and pass the bundles on to slowly rotating retarders by which the bundles are checked in their forward movement until they can be combed out and distributed by the rapidly rotating feeder cylinder which is positioned beyond and somewhat above the retarders. From the feeder cylinder the grain is fed downward to the threshing cylinder and thence on through the separator in the usual manner.

The band cutters of the feeder here disclosed are of novel construction, being lighter in weight than is usual in this art and also rigid and strong. Furthermore, the knives can be readily removed for sharpening or replacement. The cutter is cheap to construct, reliable in operation, and well adapted to resist the strains incident to the heavy service which it is called upon to fulfil.

The band cutting knives 1 are preferably of the curved shape, shown in Fig. 13, with a serrated cutting edge and with a base 2 fluted, as shown, for fitting tightly within a slot 4 in the outer edge of the knife holder 5, Figs. 15 and 16. Each knife holder has a large central opening 6 for the reception of the driving shaft and is also provided with six regulary spaced openings 7 through which transverse locking bolts are passed. The holder is of circular outline except at its front face, that face being straight across with side reinforcements 8 rigidly attached and forming the slot 4 into which the fluted base of the knife is driven to secure firm attachment between the knife and holder. The reinforcements 8 may be cut away at a plurality of points to form openings 9 at which the inner edge of the knife is exposed and made accessible. This is also of advantage in the manufacture of the castings to vent and support the core of the openings for the knife.

Fig. 11 shows the knives as assembled on their driving shaft 10. That shaft is round in section and carries flanges 11 keyed thereon and between which the six knife holders and their spacing cylinders 12 are firmly clamped by six bolts 13 mounted in the flanges and passing through the holes 7 (Fig. 15) of the knife holders. The spacing cylinders 12 are preferably of sheet steel slipped on over the tightening bolts 13 and acting as spacers and clamps for the knife holders, while at the same time giving rigidity to the structure as a whole without increasing its weight unduly.

Inasmuch as there are six holes in each knife holder, that holder can be put on the shaft 10 in six different angular positions, so that by staggering the knives, as shown in Figs. 11 and 3, a uniform and efficient operation of the band cutter is insured. All of the knives are interchangeable at will from one position to another, and the symmetry and uniformity in detail make renewals an easy matter.

By using a plain round shaft, as above described, free from hexagonal shoulders or areas, no considerable machine work is required at the journaled ends, and the shaft is relatively light and inexpensive. The tubular spacers between adjacent knife holders give a maximum of strength with a minimum of material and labor.

The feeder cylinder is mounted in the rear of the band cutting knives on a transverse shaft 14, one end of which carries a ball governor for regulating the operation of the feeder, and the other end of which carries an auxiliary governor or straw governor which operates to quickly stop the rotary movement of the feeder cylinder in emergency, and indirectly operates on the ball governor to stop the retarder and the conveyer, as hereinafter explained.

The feeder cylinder comprises three sets of spokes 15, each set terminating in a cast ring 16 having bearing blocks 17 (Fig. 7) provided with adjustable and removable caps 18 normally held in place by bolts 19. These three sets of spokes and their supported rings form a spider for adjustably supporting the cylinder bars whereon the teeth are carried.

Each cylinder bar is of the general shape shown in Fig. 4 and comprises three round portions 20, 21 and 22 one at each end and one in the center, these portions being adapted to seat within the bearing blocks 17 of the spider rings and to be held there tightly through frictional engagement with the adjustable caps 18. The other portions of these cylinder bars are half round in form on the underside as at 23, Fig. 4, but are cut away along their top faces to form relatively sharp edges or corners 24. Also, along the top of the bar, and integral therewith, are a plurality of tapering teeth or fingers 25. When the bars are adjusted to the position indicated in full lines, Fig. 5, the teeth 25 stand out radially in position to tear up incoming bundles of grain and distribute the material in a uniform layer for feeding to the cylinder of the thresher. With the bars in this position, the feeder cylinder is well adapted to handle damp or tangled bundles tearing them apart and distributing the straw as desired. With the grain in damp condition there is no danger of breaking the straw too much or of cracking the grains of wheat or other seed. But when the wheat or other grain being threshed is in a very dry and brittle condition breakage of the straw might result, with consequent difficulty in separating the grain from the chaff, and under these conditions it is desirable to tilt the fingers of the feeder bars backward, as shown in dotted lines, Fig. 5, so that they strike a glancing blow against the bundles. In extreme cases the bars will be turned over a full ninety degrees, so that the front or working face of the bar will consist of the rounded portion 23, the teeth projecting backward and having little or no action on the straw. If the grain is dry enough and brittle enough, the beating action of these round cross bars of the feeder cylinder will effect all the tearing action necessary or desirable. This adjustability of the cylinder, to meet the particular condition of the grain being threshed, is an important feature of the feeder here disclosed and gives to the feeder a flexibility of action which I believe to be new in this art.

The auxiliary governor or straw governor, which is mounted on the end of the feeder cylinder shaft, fulfils an important function in regulating the operation of the feeder.

Governors for thresher feeders have been used heretofore, but in general they do not come into action to check the incoming bundles until after the speed of the threshing machine has dropped below normal by an appreciable amount. Thus, if the feeder is being over-crowded with bundles and is choking up either at the feeder cylinder or at the thresher cylinder, this over-supply of bundles will not be checked until the thresher drops in speed to trip the governor. Through the emergency of the auxiliary governor, here disclosed, the feeder is made self regulating independently of the thresher cylinder to the extent that choking or an over-supply of grain in the feeder will call the auxiliary governor into action, slowing up the feeding cylinder without slowing up the thresher cylinder while at the same time tripping the main governor of the feeder to stop rotation of the retarders and to stop forward movement of the bundle carrier.

Figs. 9 and 10 show one form of auxiliary governor which can be used to good effect for the purposes and with the objects above outlined. This governor is in the nature of a combined friction clutch and a driving pulley 30 and has one element fastened to the feeder cylinder shaft 14 and another element movable with the pulley flange with coöperating means for bringing these two elements into frictional engagement at predetermined pressure, so that when the shaft demands for its rotation, more power than should be necessary for proper operation, the frictional engaging surfaces will slip, allowing the pulley to turn without producing corresponding rotation of the cylinder shaft.

In the construction illustrated, the shaft 14 carries a flat disk 26, integral with a hub 27, which is secured in place by a set screw 28. This hub 27 is shaped on the outside to serve as a bearing for the pulley, and to keep the pulley in place, it is encircled by a ring 29 clamped to the hub by the set screw 28.

The flange of the pulley 30 is carried by short spokes 31 which are united by a flat ring 32 having its side face in frictional contact with the disk 26. The ring 32 carries four pairs of lugs 33 which project sidewise to overlap the ends of disk 26 and to afford pivotal mounting at 34 for the levers 35 used to regulate the slipping tendency of the clutch. There are four of these levers 35, one between each pair of lugs 33 and each of them has a rounded nose 36 bearing against a friction ring 37 which fits against a face of the flange 26. This ring 37 has projecting lugs 37', Fig 9, which overlap the lugs 33 and thus insure positive rotation for the ring 37 with the pulley. The other end of each lever 35 is curved inward to receive the end of a stud 38 rigidly seated in the hub of the wheel and enveloped by a helical spring 39 which bears yieldingly against the end of the lever 35, swinging it outward to govern the pressure at nose 36, thereby to govern the frictional engagement between disk 26 and its adjacent rings 37 and 32. Adjusting nuts 40, mounted on stud 38, may be used for varying the pressure on the lever arm, thereby giving to the clutch an easy mode of adjustment to regulate the point at which the frictional engagement is no longer sufficient to transmit the power demanded by the cylinder. It is at this point that the pulley begins to slip and slow up the speed of the feeder cylinder until the grain then in the feeder can be passed on to the thresher and there disposed of. By regulating the tension of the spring, the frictional engagement may be adjusted to release the pulley at any predetermined overload. Then if an abnormal amount of straw be carried to the feeder cylinder the auxiliary governor will slip before the straw passes between the retarder and the feeder cylinder, thus reducing the speed of the feeder cylinder, and through connections which are hereinafter described will cause the main or speed governor of the feeder to stop and stop the retarders and the carrier until after the excess of straw has been combed out by the feeder cylinder and until the feeder thus relieved from overload has returned to normal power consumption. Then the main governor will again establish driving connections to the retarder and to the bundle carrier or elevator and the feeder will run on in normal manner. These changes in speed at the feeder cylinder and at the retarder and bundle elevator go on wholly independently of the thresher speed which, so far as concerns the actions above described, may be absolutely uniform and undisturbed.

The main or speed governor, which is carried on the opposite end of the cylinder shaft 14, is of improved construction and is shown in detail, Fig. 8. It comprises a double bracket 41 rigidly fixed to shaft 14 by a set screw 42 and constituting a supporting frame for a pair of ball weights 43, each carried on the outer end of an arm pivoted at 44 and having an inwardly projecting finger 45 engaging in a slot of a slidingly mounted double collar 46. Each ball 43 is slotted across its outer face to receive the end of a spring 43', whereby the balls are drawn toward each other when shaft 14 is at rest and by the expansion of which the balls are allowed to move outward under centrifugal action as the speed goes up. Their outward movement slides the collar outward along the shaft, producing corresponding movement in an adjustable lever used to unlatch the driving connections of the retarders. By having the main governor mounted directly on the feeder cylinder shaft, it is in most convenient position for connection with other parts of the mechanism, and the simplicity of its construction and the reliability of its operation contribute materially to the success of the feeder here disclosed.

The adjustable lever, controlled by the main governor and used as a control for the tripping device of the retarders, is pivotally supported from the side of the feeder on a projecting bracket 47 having two ears and a transverse bolt 48 to serve as a pivot. The lever is in two parts both pivoted to the bolt 48. The part 49 has an end projection reaching into a slot of the sliding collar 46, so that movement of the governor balls will produce corresponding movement in the element 49. At its other end the part 49 carries a bolt 50 with a wing nut adjustable to shift the lever arm 49 with respect to the lever arm 51. Arm 51 carries at its other end a projecting lug 52 which engages with a latch 53 carried by a disk 54 on the conveyer shaft 55.

By suitable adjustment of the wing nut the angle between the two lever arms may be adjusted, thereby determining the speed at which unlatching will occur.

The driving connections for the several shafts and other rotating parts of the feeder are best shown in Figs. 1 and 2. Power obtained from a pulley 68, mounted on the shaft 69 of the thresher cylinder, is transmitted through a belt 70 to a pulley 71 on the band cutter shaft and also to the clutch pulley 30 on the cylinder shaft 14. A belt tightener 73, controlled by a coiled spring 74, may be used to keep an efficient driving tension on the belt while at the same time insuring adequate area of contact of the belt with the feeder pulley and flexibility in the driving connection as a whole. The speed of this belt may, with advantage, be high enough to give a peripheral speed of about four thousand feet per minute at the feeder cylinder when there is no slipping at the friction pulley. At the other side of the machine, as shown in Fig. 2, the band cutter shaft carries a pinion 75 meshing with a much larger gear 76 carried on a short shaft 77 supported in an adjustably swinging bracket 78 and carrying a small sprocket 79, receiving a chain 80 which passes around an idler 81 and over a sprocket 82 mounted on the shaft 55 of the conveyer, but free to turn thereon when the latch 53 of Fig. 8 is held out of engagement with the projecting lug 52 which projects from the governor lever 51.

The retarder shaft 84 is connected up through suitable sprockets and a chain to the conveyer shaft 55 and furthermore is capable of vertical adjustment in the slots 87' in the usual manner to vary the width of the throat or opening between the retarders and the feeder cylinder. This adjustment is effected by means of a handle 85 accessible when the machine is running and connected through a bell crank to a link 86 pivoted to the supporting plate 87 of the retarder shaft. On the opposite side of the machine, as shown in Fig. 1, a similar link 87, actuated by a crank arm 88, is connected with the shaft supporting casting 89. As shown in Fig. 1, one end of the conveyer shaft 55 carries a crank connected through a link 90 to a crank arm 91 attached to the upper part of the grain board 92 (Fig. 3) and serving to move that board up and down with a rocking motion to slide the grain downward toward the thresher cylinder. The grain board has a lower section 93 over which the section 92 slides, these sections being positioned for easy removal to give access to the cylinder for examination and adjustment of the cylinder teeth.

When the machine is in operation, bundles of grain carried upward by the conveyer are passed under the band cutting knives and then come in contact with the slowly moving teeth of the retarders which check and hold the lower part of each bundle while the top part is being combed off by the rapidly rotating feeder cylinder. With dry and brittle grain the teeth of the feeder cylinder may be turned back, leaving the smooth rounded faces of the cross bars for producing the combing or beating action, but with damp or tough bundles, the teeth of the feeder cylinder are preferably swung outward to tear through the tangled mass and break it up for delivery to the threshing cylinder. The distributed bundle, as it is combed forward over the retarders, is dropped down on the threshing cylinder and is carried through by the threshing teeth. The retarder shaft can be shifted toward or from the shaft of the feeder cylinder to regulate the throat opening, in accordance with the condition of the grain and straw.

In case of over-feeding and resultant choking in front of the feeder cylinder, the driving pulley for that cylinder will come into action as an auxiliary governor, slipping with respect to the feeder shaft, thereby slowing up the shaft, and by so doing dropping the speed of the main or ball governor and swinging its lever to unlatch the driving connection to the retarders and the grain carrier. This stops the further entry of bundles into the machine and leaves the feeder cylinder running at moderate speed to comb out the tangled mass and clear the feeder before again starting the carrier into action.

After the overload has been relieved and the feeder cylinder has again come up to normal speed, the ball governor will throw the latch to connect up the retarders and the carrier, and normal operation will be resumed. This action of the auxiliary governor, in controlling conditions within the feeder, is independent of such actions in the main governor as may be brought about by variations in speed of the driving engine. If, for instance, the driving engine slows down to a speed at which the separator will not work to the best advantage, the ball governor will unlatch the driving connection to the retarders and the grain carrier, stopping the advance of grain into the feeder and giving the engine a chance to come back to normal speed on light load. During such a speed variation as this, the auxiliary governor plays no part in regulating the operation of the machine.

I am aware elements of the construction here shown may be varied in detail and in position, and that many minor changes may be made without departing from the spirit of my invention as defined by the appended claims.

What I claim as new and desire to secure by Letters Patent is:

1. In a thresher feeder, a cylinder comprising a spider carrying cross bars, said bars being provided with teeth and being adjustable to vary the inclination of the teeth.

2. In a thresher feeder, a cylinder having transverse bars rounded on their inner faces, and presenting teeth at their front faces, said bars being movable to swing the teeth rearwardly when the tearing action of the cylinder is to be reduced.

3. In a thresher feeder, a cylinder comprising a spider having bearings with adjustable caps, cross bars having cylindrical areas fitting within said bearings, said bars being rounded on their inner faces, and presenting teeth on their outer faces, said bars being adapted to swing around in said bearings to vary the tearing action of the cylinder in accordance with the condition of the incoming grain.

4. In a thresher feeder having a bundle carrier and a band cutter, the combination of a feeder cylinder, independent of the band cutter and thresher cylinder, a drive shaft supporting said cylinder, and a ball governor mounted directly on said cylinder shaft and operatively connected to regulate the starting and stopping of said carrier in accordance with the speed at which the feeder cylinder is running.

5. In a thresher feeder, the combination of a band cutter, a feeder cylinder, independent of the band cutter and thresher cylinder, a drive shaft for said cylinder, a friction pulley carried on one end of said shaft through which power is supplied for driving said shaft, a main governor mounted directly on the other end of said shaft, and means controlled by said main governor for regulating the supply of bundles being carried into the feeder.

6. In a thresher feeder, the combination of a bundle carrier, means for driving said bundle carrier, said means including a clutch, a feeder cylinder mounted on a suitable shaft and running at high speed, a ball governor mounted on the end of said shaft, and a lever operatively connecting said governor with said clutch, said lever being adjustable in its angular setting to vary the action of said governor on said clutch.

7. In a thresher feeder, the combination of a bundle carrier, means for driving said carrier, said driving means including a latch by which the driving connection may be interrupted, a cylinder for said feeder, a ball governor operatively connected to rotate with said cylinder, and a two part lever operatively connecting said governor with said latch, the parts of said lever being adjustable in their angular relation to one another to vary the action of said governor on said latch.

8. In a thresher feeder, the combination of a bundle carrier, retarders positioned to turn slowly at the end of said carrier, band cutting knives rotated above said carrier, a shaft whereon said knives are carried, said shaft being provided with a pulley, a feeder cylinder in the rear of said retarders, means for driving said band cutters and said cylinder, said means including a friction clutch permitting a decrease in speed of said cylinder in case of overloading, and means directly responsive to a decrease of speed at the feeder cylinder irrespective of the speed of the thresher cylinder for checking the advance of grain along the carrier and into the retarders.

9. In a thresher feeder, the combination of a bundle carrier, band cutting knives positioned above said carrier, retarders receiving the bundles after the bands have been cut, a feeder cylinder positioned to comb out the material while on the retarders, means for driving said band cutting knives and said feeder cylinder, said driving means including a friction device permitting a decrease in speed of the cylinder in case of overloading, driving connections to said retarders and said bundle carrier, and a main governor directly responsive to changes in speed of said feeder cylinder to interrupt said last named driving connections when the speed of said feeder cylinder is too low.

10. In a thresher feeder, the combination of a feeder cylinder positioned on a rotating shaft, a friction clutch mounted on one end of said shaft and serving as a drive pulley, a ball governor mounted on the other end of said shaft, band cutting knives in advance of said cylinder, a conveyer for carrying bundles under said knives, retarders positioned for receiving said cut bundles, driving connections for said retarders and said carrier, and means controlled by the ball governor for stopping the bundle carrier when the thresher drops in speed, said means being also actuated by said governor when the feeder cylinder drops in speed even though the thresher be at that time still running at normal speed.

11. In apparatus of the class described, a feeder carrier, a feeder cylinder, a band cutter, a slip drive limiting the power applied to drive said feeder cylinder and therefore reducing the speed thereof upon overfeeding, a speed governor mounted on the shaft of said slip drive end controlled directly by said feeder cylinder and controlling the feeder carrier to interrupt the latter when the speed of the feeder cylinder is reduced.

12. In a thresher feeder the combination of a feeder carrier for carrying bundles into the machine, of a band cutter, a shaft, a feeder cylinder thereon to untangle the bundles and present them to the thresher cylinder, a slip drive for said feeder cylinder to permit the same to slow down when choked by excess supply, a governor associated with said shaft and means whereby said governor directly controls said feeder carrier and may stop the same when the feeder cylinder slows down, and a thresher cylinder rotatable at a speed independent of variations in the speed of the feeder carrier and independently of the stoppage of the feeder carrier.

13. In a thresher feeder, the combination of a bundle carrier and means to drive the same, a band cutter, a feeder cylinder designed to untangle and present the stock to a thresher cylinder, and independent of the thresher cylinder, a governor associated with the feeder cylinder and adapted to control the drive of the bundle carrier whereby the latter may be stopped when too much stock is presented to the feeder cylinder, without disturbing the speed of rotation of the thresher cylinder.

In witness whereof, I hereunto subscribe my name to this specification in the presence of two witnesses.

HOWARD F. SNYDER.

Witnesses:
W. L. PICKENS,
W. H. A. THOMAS.

Copies of this patent may be obtained for five cents each, by addressing the "Commissioner of Patents, Washington, D. C."